(No Model.)
J. L. SMITH.
CHURN.
No. 428,323. Patented May 20, 1890.
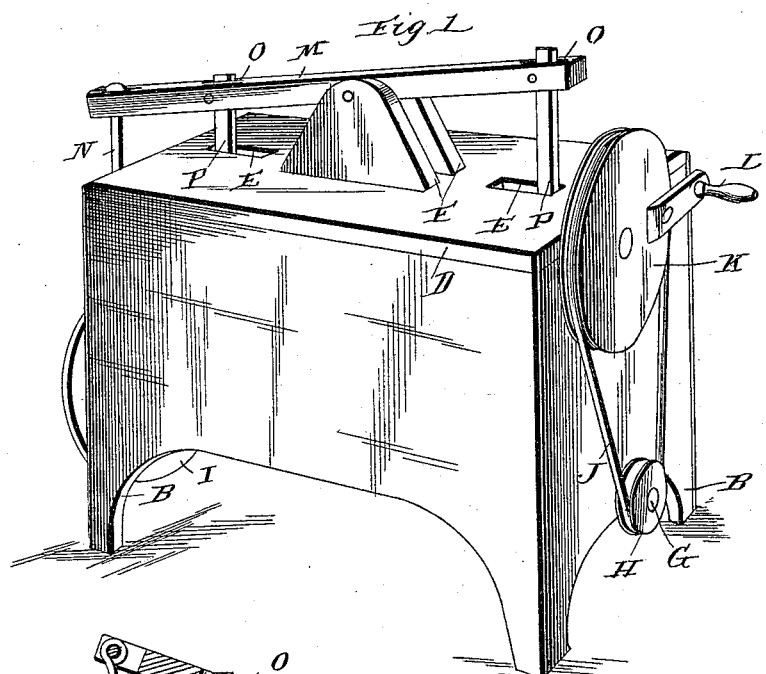
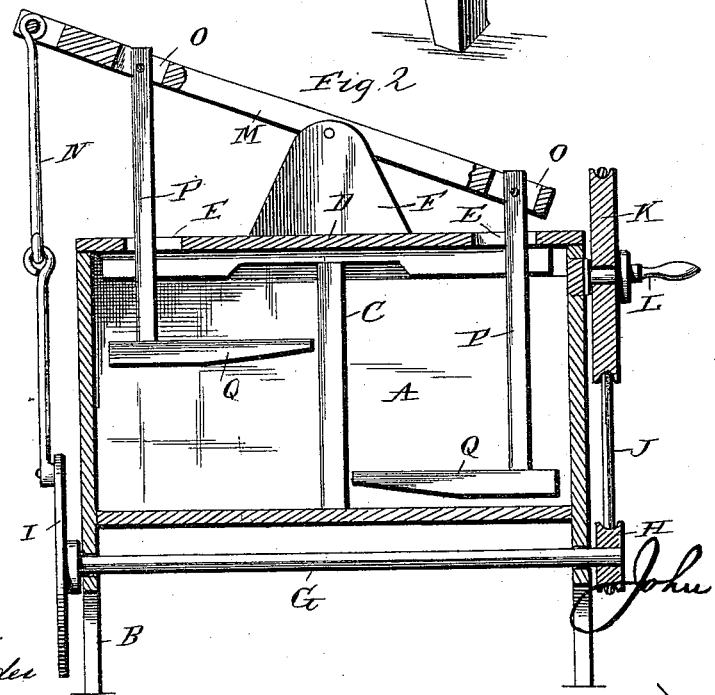

UNITED STATES PATENT OFFICE.

JOHN L. SMITH, OF UNIONVILLE, MISSOURI.

CHURN.

SPECIFICATION forming part of Letters Patent No. 428,323, dated May 20, 1890.

Application filed January 11, 1890. Serial No. 336,616. (No model.)

*To all whom it may concern:*

Be it known that I, JOHN L. SMITH, a citizen of the United States, residing at Unionville, in the county of Putnam and State of Missouri, have invented certain new and useful Improvements in Churns; and I do hereby declare the following to be a full, clear, and exact description of the invention, such as will enable others skilled in the art to which it appertains to make and use the same.

My invention relates to improvements in churns; and it consists in certain novel features hereinafter described and claimed.

In the accompanying drawings, Figure 1 is a perspective view of a churn constructed in accordance with my invention. Fig. 2 is a vertical longitudinal section of the same.

Referring to the drawings by letter, A designates the churn-body, the sides and ends of which are extended downward below the bottom so as to form the supporting-legs B, as clearly shown. Within the body on the opposing side faces of the same I secure the ribs or guides C, which serve to guide the dashers in the operation of the device and prevent them interfering with each other in their movements. The lid D is provided near its ends with longitudinal slots E, and on its upper side at about its center I secure the fulcrum-blocks F, the functions of which will hereinafter appear.

In the lower extended portions of the ends of the churn-body I journal a shaft G, which extends below the body and is provided at one end with pinion H and at its other end with a crank wheel or disk I. The pinion or pulley H is connected by a belt or sprocket-chain J with the driving-wheel K, mounted on a stub-shaft projecting from the end of the body near the top of the same, and this driving-wheel is provided with a crank arm or handle L, by means of which it may be operated.

Between the fulcrum-blocks F, I pivot the vibrating lever M, one end of which is connected by a pitman N with the crank wheel or disk I, as clearly shown. This lever M is provided near its opposite ends with the slots or openings O, and the dasher-staffs P have their upper ends pivoted within the said slots or openings and extend downward therefrom through the slots E in the lid and have the dashers Q secured to their lower ends, the said dashers Q consisting of flat plates arranged between the guides or ribs C and the ends of the churn-body and adapted to play vertically therein.

From the foregoing description, taken in connection with the accompanying drawings, the operation and advantages of my improved churn will be readily understood. The cream is placed in the churn-body and the lid placed on the body so as to close the upper end of the same, after which the operating-wheel is rotated so as to impart motion to the longitudinal shaft G and thereby vibrate the lever M through the medium of the crank-disk I and the pitman N. The dashers will thus be caused to reciprocate alternately in the churn-body, so that the cream will be agitated and the butter quickly formed.

It will be observed that in my improved churn the operating mechanism is connected directly to the churn-body and is so arranged that the churn can be easily operated and a large quantity of cream operated upon. The several parts of the operating mechanism are all connected so that a direct and positive movement will be given the vibrating lever and the churn continuously operated.

Having thus described my invention, what I claim as new, and desire to secure by Letters Patent, is—

The combination, with the body having its ends extended to form legs and the lid provided with fulcrum-blocks on its upper side, of the longitudinal shaft journaled in the extended portions of the ends of the body, the pinion at one end of said shaft, the crank-disk at the opposite end of the same, the driving-wheel mounted on the end of the body and connected with the pinion, the lever pivoted between the fulcrum-blocks, the dasher-staffs pivoted to said lever and depending therefrom into the churn-body, and the pitman connecting the end of said lever with the crank-disk, as set forth.

In testimony whereof I affix my signature in presence of two witnesses.

JOHN L. SMITH.

Witnesses:
   J. A. SMITH,
   LEE T. ROBISON.